Patented Aug. 13, 1946

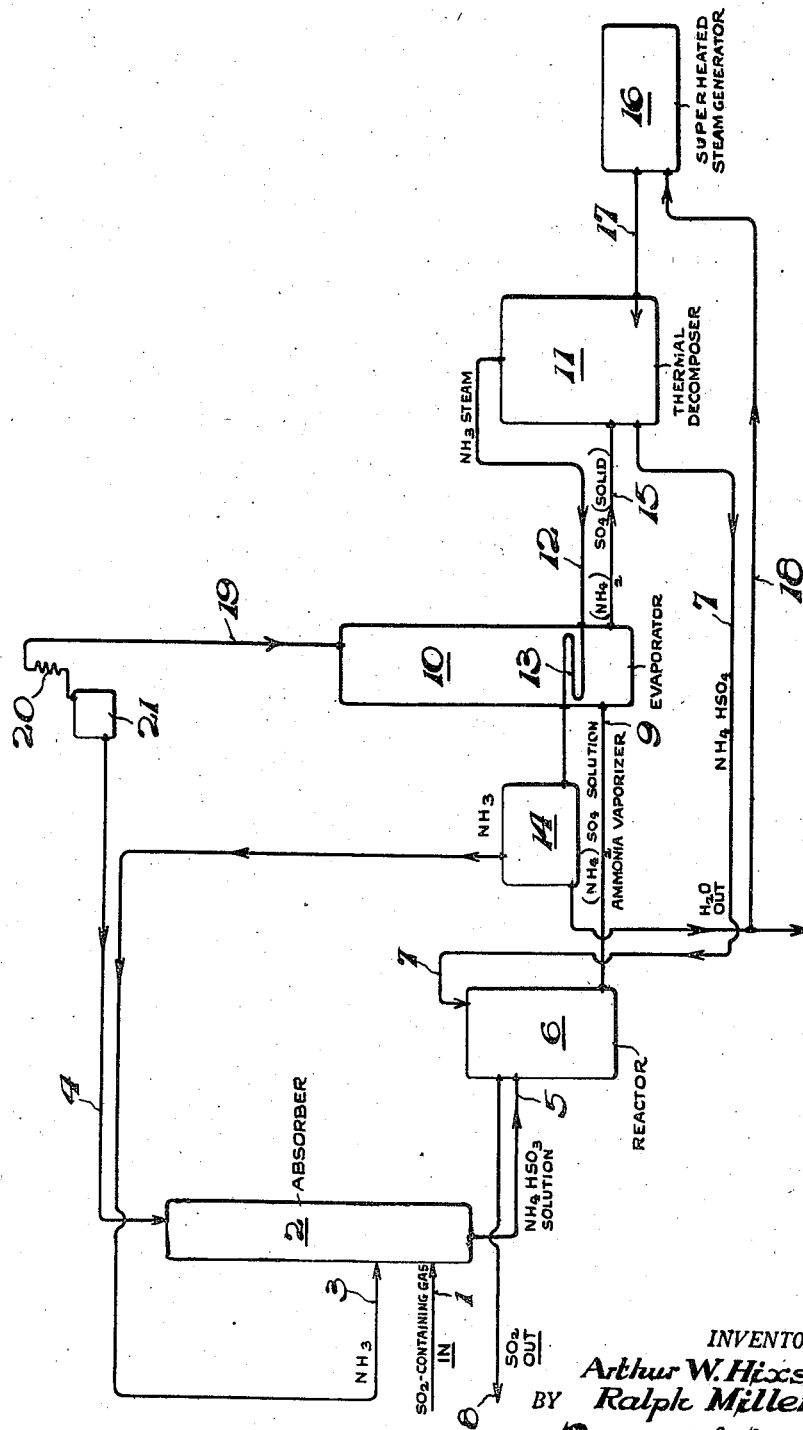

2,405,747

UNITED STATES PATENT OFFICE 2,405,747

RECOVERY OF ACIDIC GASES

Arthur W. Hixson, Leonia, N. J., and Ralph Miller, Woodside, Long Island, N. Y., assignors to The Chemical Foundation, Incorporated, a corporation of Delaware, as trustee Application April 20, 1944, Serial No. 531,936

9 Claims. (Cl. 23—178)

This invention relates to the recovery of acidic gases, more particularly to the treatment of gas mixtures having relatively low concentrations of acidic gases to remove and recover such gases in concentrated form.

As is known, the usual method of removing and recovering acidic gases comprises absorbing the gas in a liquid which has a preferential affinity for the gas under the particular conditions of the absorption operation but which readily releases the gas in the regenerative step. Such a method is not particularly efficient when the gas is a strong acid and when it occurs in small concentration in the gas mixture. A classic example of this problem is found in the removal of sulphur dioxide from flue gas. To date, no truly economical method has been advanced which solves this problem. A particular disadvantage of prior art methods was the fact that substantial oxidation of the sulphur dioxide took place in the absorption step, involving consequent loss of $SO_2$, and consumption of reagents to eliminate the sulphates thus formed.

It has been found that gas mixtures of the type described, i. e., those containing low concentrations of acidic gases may be economically treated by invoking a novel method of approach. This method, for the sake of a term, may be defined as a cyclic volatile base system and, as will be seen, involves a closed cycle into which, except for mechanical losses, only sulphur dioxide is introduced and withdrawn. The absorption and regeneration system utilizes essentially a volatile base, an acidic constituent and a salt which may be decomposed to regenerate the said volatile base and acidic constituent. Among other advantages, the present invention is characterized by the fact that the absorption may be carried out under such circumstances as to greatly minimize the oxidation of sulphur dioxide.

In order to enable a more ready comprehension of the invention a flow sheet of the process is shown in the accompanying drawings.

With respect to the recovery of sulphur dioxide there are two materials which abundantly satisfy the requirements of the cyclic volatile base system. These are ammonium fluoride and ammonium sulfate. When these salts are heated they are decomposed into a volatile base, namely, ammonia, and an acid salt, namely, ammonium acid fluoride and ammonium bisulphate respectively. When the liberated ammonia is dissolved in water and contacted with a sulphur dioxide-containing gas, such as flue gas, the sulphur dioxide reacts with the ammonium hydroxide to form ammonium bisulphite. If the bisulphite solution is treated with one of the acid salts mentioned at the proper temperature and under proper conditions, sulphur dioxide is evolved and the original salt, i. e., ammonium fluoride or ammonium sulphate is reformed. The process then consists of a closed cycle into which, disregarding incidental mechanical losses, only sulphur dioxide is introduced and from which only sulphur dioxide is withdrawn.

Ammonia is the preferred material for the volatile base. This presents several important advantages among which is its moderate cost, relatively high volatility and the fact that it permits high concentrations of sulphur dioxide to be taken up in water as ammonium bisulphite, thus commensurately diminishing the volume of absorbing liquid circulated through the absorber with corresponding thermal economies in the subsequent stages.

Ammonium fluoride is one of the effective agents which may be employed in the cyclic volatile base system. Although, as will be seen hereinafter, ammonium sulphate is the preferred salt ammonium fluoride does possess certain individual advantages. In using this material in the novel sulphur dioxide cycle the sequence of operations will have been appreciated. When an ammonium bisulphite solution is added to ammonium bifluoride and the solution is heated, sulphur dioxide is evolved and ammonium fluoride is formed in solution. If the ammonium fluoride solution is evaporated some ammonia is evolved. The stable compound of ammonia and hydrofluoric acid in the liquid state is ammonium bifluoride. This has a boiling point of 240° C. and a melting point of 125° C. Thus, in heating ammonium fluoride to a temperature above 125° C. and below 240° C. it will be decomposed into ammonia and ammonium bifluoride which are directly reemployed in the described cycle. It will thus be seen that the use of ammonium fluoride in the cycle presents the advantages of relatively low temperature operation in the thermal decomposition step.

However, the use of ammonium fluoride does present some disadvantages. In the thermal decomposition not an inconsiderable quantity of hydrogen fluoride tends to be evolved. This is due to the fact that liquid ammonium acid fluoride has an appreciable vapor pressure; this is apparent from the fact that at 240° C. its vapor pressure is equal to atmospheric pressure. It will be observed also that only about a half of the ammonia in the system is usefully employed in the absorption of sulphur dioxide. However, it has been found that by the use of potassium fluoride the vaporization of hydrogen fluoride can be substantially decreased if not completely eliminated and therefore practically all of the ammonia can be used in the entire cycle.

The advantages of employing potassium fluoride in conjunction with an acidic gas and ammonia may be appreciated by considering the following method of carrying out the process: A solution of ammonium bisulphite is first formed by scrubbing the flue gases with an ammoniacal solution. When the concentration of the ammonium acid sulphite is sufficiently high it is passed from the scrubber unit to a tank, in which it is treated with potassium acid fluoride to evolve sulphur dioxide according to the following equation:

(1) $NH_4HSO_3 + KHF_2 = NH_4F + KF + H_2O + SO_2$

This reaction may be accelerated by maintaining the solutions at about the boiling point. Since the sulphur dioxide is insoluble in the hot solution it is readily evolved.

The sulphur dioxide-denuded solution is then evaporated in any suitable manner and the mixed salts are heated to evolve ammonia and potassium acid fluoride according to the following equation:

(2) $KF + NH_4F = KHF_2 + NH_3$

This thermal decomposition is readily effected at temperatures of the order of 200° C. or somewhat higher.

The ammonia which is evolved is recycled to the sulphur dioxide absorption step and the regenerated potassium acid fluoride is returned to the sulphur dioxide evolution step.

As will be understood by those skilled in the art, the reaction of ammonium fluoride and potassium fluoride to produce ammonia and potassium acid fluoride may be effected in a number of ways. Preferably, the heating is carried out by using superheated steam in direct contact with the reactants. This presents a number of advantages, for example, the temperature control is simplified; the recovery of ammonia is facilitated, due to the absence of non-condensible gases, and the material of construction problem is simplified. The materials used in the construction thus need only possess satisfactory resistance to the action of potassium acid fluoride and need not have good heat transfer properties; thus, carbon lined equipment is eminently satisfactory.

Ammonium sulphate possesses certain advantages over ammonia fluoride and by reason of this is generally preferred. Important among these is that ammonium sulphate does not attack the usual materials of construction, as does the corresponding fluoride, and that such small amount of sulphate which may form, due to oxidation of sulphur dioxide in the absorber, is more readily eliminated in the ammonium sulphate cycle. It does require higher temperatures for the thermal decomposition step than does the fluoride but, economically, this is more than offset by its inherent advantages.

As will now have been appreciated, the essential steps in the process utilizing ammonium sulphate as the decomposable-regenerative salt are: Step 1, the extraction of $SO_2$ from the gas by means of ammonium hydroxide according to the equation:

(3) $NH_4OH + H_2SO_3 = NH_4HSO_3 + H_2O$

Step 2, regeneration and recovery of the $SO_2$ by treating the bisulphite solution with ammonium acid sulphate according to the following equation:

(4) $NH_4HSO_3 + NH_4HSO_4 =$
$(NH_4)_2SO_4 + SO_2 + H_2O$

Step 3, the conversion of the ammonium sulphate to regenerate ammonia for Step 1 and ammonium acid sulphate for Step 2, according to the following equation:

(5) $(NH_4)_2SO_4 = NH_3 + NH_4HSO_4$

The operations represented by Equations 3 and 4 present no special difficulty. The thermal decomposition of ammonium sulphate to ammonia and ammonium acid sulphate however presents some difficulties. As is known, when ammonium sulphate is heated to a temperature of the order of 140° C. to 150° C. a small amount of ammonia is evolved and at a relatively slow rate. As the temperature is increased more ammonia is liberated and at a more rapid rate. When the temperature exceeds about 350° C. an oxidation-reduction reaction takes place which leads to reduction to nitrogen and sulphur dioxide. It will be apparent that this latter reaction should be restricted and if possible should be totally avoided to insure economic operation. In this operation also there is a progressive change in the composition of the material being heated which introduces certain difficulties. As ammonia is progressively evolved from ammonium sulphate a series of residual mixtures of ammonium acid sulphate and ammonium sulphate are formed. These mixtures have progressively varying melting points, depending on their composition. Such a variation in melting point with changes in the composition is illustrated in the following table:

| Mol, percent, $NH_4HSO_4$ | M. P. of mixture, °C. |
|---|---|
| 100 | 146.9 |
| 96.32 | 144.1 |
| 93.84 | 141.7 |
| 91.46 | 137.2 |
| 89.90 | 147.2 |
| 89.14 | 151.7 |
| 87.66 | 159.3 |
| 85.64 | 176.7 |
| 84.04 | 187.7 |
| 80.44 | 210.2 |
| 78.76 | 218.5 |
| 76.72 | 229.2 |
| 75.24 | 232 |
| 73.10 | 269.2 |
| 72.04 | 281.5 |
| 65.26 | 318 |

It can be seen from the above table that at a temperature of 300° C. about 68% decomposition of the initial ammonium sulphate must take place before the resultant mixture of ammonium sulphate and ammonium acid sulphate melts. Solid ammonium sulphate is a poor heat conductor. Therefore, any method for thermally decomposing ammonium sulphate which consists in placing it in a suitable corrosion resistant container and heating the outside of the container by direct firing will not be economical. In order to keep the temperature of the inside wall of the container below 350° C., it will be necessary to keep the products of combustion which come in contact with the walls of the container at a temperature not appreciably higher than 350° C. Should the products of combustion used to heat the ammonium sulphate be considerably higher than 350° C., the temperature of the inside wall of the container will exceed 350° C. because solid ammonium sulphate is a poor heat conductor and the heat cannot be transferred rapidly enough away from the walls to keep the temperature down. If the temperature inside the container exceeds 350° C., as previously pointed out, then ammonium sulphate will decompose into $SO_2$ and nitrogen thus consuming the reagent. If the products of combustion are kept sufficiently low to prevent the destruction of ammonia, then the heat transfer will be low and unduly expensive equipment will be needed to carry out this step in the process.

In efforts to solve this problem it has been proposed to heat a fluid mixture of ammonium sulphate and ammonium acid sulphate internally by passing an alternating current through the fused salt mass. Ammonium sulphate in the mass is decomposed due to heat caused by the passage of the electric current. Ammonia is evolved continuously as ammonium sulphate is continuously added to the molten electrolyte and liquid ammonium acid sulphate is continuously removed. This method of decomposing ammonium sulphate is feasible but expensive due to the relatively high cost of electric power.

The thermal decomposition of ammonium sulphate is readily accomplished by employing superheated steam in direct contact with the salt undergoing decomposition as the heating medium. By the use of superheated steam in direct contact as the sole source of heat, the container material need only be resistant to the corrosive action of ammonium acid sulphate. Equipment lined with acid brick, carbon brick or silicon carbide brick is satisfactory. The advantages of using superheated steam to effect the thermal decomposition of ammonium fluoride in the presence of potassium fluoride has been mentioned previously. What follows with respect to the advantages of using superheated steam to thermally decompose ammonium sulphate applies equally well to the thermal decomposition of ammonium fluoride.

The extent and rate at which ammonia is liberated from a mixture of ammonium sulphate and ammonium acid sulphate depends upon the vapor pressure of ammonia of the mixture and the partial pressure of ammonia over the mixture. The vapor pressure of ammonia of a mixture of ammonium sulphate and ammonium acid sulphate is determined by its temperature. The rate and extent to which ammonium sulphate is decomposed at a fixed temperature will be a function of the partial pressure of ammonia over the salt. If the partial pressure of ammonia is reduced, then the extent of the decomposition will be increased. By passing steam over or through decomposing salt, the ammonia is continuously swept away. In this way the partial pressure of ammonia is maintained at a very low figure and the decomposition can proceed. Thus, the steam has the dual function of supplying heat to the reaction and decreasing the partial pressure of the ammonia enabling the reaction to proceed.

The ammonia is readily recovered by condensing the steam to water in the ammonia steam mixture which is formed in the thermal decomposition. The heat in the steam is utilized to evaporate the ammonium sulphate solution formed in the sulphur dioxide evolution step. In this way the latent heat of condensation is usefully employed thus making for a highly efficient thermal cycle.

The operation of the novel process will be clear from a consideration of the accompanying flow sheet. The sulphur dioxide-containing gas is fed through the line 1 to the lower position of absorber 2. Contemporaneously ammonia gas, in the required stoichiometrical amount may be fed to the absorber through line 3. In the absorber the gases are countercurrently contacted and scrubbed with a stream of water entering the upper portion of the absorber through line 4. As previously explained, in the absorber the sulphur dioxide is taken up in the ammonia solution with the resultant formation of ammonium bisulphite according to Equation 3. The bisulphite solution is continuously withdrawn and passed through line 5 to the reactor 6. In this unit the bisulphite solution is reacted with ammonium acid sulphate charged thereto through line 7. The solution in the reactor is preferably maintained at about the boiling point and sulphur dioxide and ammonium sulphate is formed according to Equation 4. The sulphur dioxide which is evolved is withdrawn through line 8 to storage or for further processing.

The ammonium sulphate solution accumulating in the reactor is passed through line 9 to the base of the evaporator 10. In the evaporator this solution may be evaporated in any suitable manner, as for example by indirect heat exchange with the saturated steam withdrawn from thermal decomposer 11. This overhead steam is passed through line 12 and coil 13 and thence to the ammonia vaporizer 14.

The ammonium sulphate accumulating in the base of evaporator 10 is continuously charged through line 15 to the thermal decomposer 11. In this unit the heat necessary for thermal decomposition is provided by superheated steam fed thereto from the generator 16 and line 17. In the unit 11 the ammonium sulphate is thermally decomposed to form ammonia and ammonium acid sulphate according to Equation 5.

The ammonium acid sulphate is recycled through line 7 to the reactor for further utilization in the cycle.

The ammonia and saturated steam passing overhead from the unit 11, as explained, is utilized, by indirect heat exchange, to evaporate water from the ammonium sulphate solution in the evaporator. This material is then passed to the ammonia vaporizer 14 in which the ammonia is vaporized. The ammonia is withdrawn overhead and is passed through line 3 back to the absorber 2. The water accumulating in the base of the vaporizer is withdrawn through line 18 and, as shown, may be returned as feed to the generator 16.

The water vapor formed in evaporator 10 passes overhead through the line 19 and thence through condenser 20 to accumulator 21 from which it is fed back to the top of absorber 2 for reemployment in the process.

It will be observed that in the described process only about half of the ammonia passes through the entire cycle. If it is desired to use all of the ammonia cyclically this may readily be done by employing sodium or potassium sulphate in lieu of ammonium sulphate. Thus, the ammonium acid sulphite from the absorber may be treated with sodium or potassium acid sulphate to evolve sulphur dioxide and to form either sodium sulphate or potassium sulphate. The resulting solution may be evaporated in the manner described and the mixed salts may be thermally decomposed to regenerate the ammonia and the sodium acid sulphate or potassium acid sulphate which are recicled and reused in the process in the manner described.

The reactions given herein have been written as though they went to completion. Although this is possible, it is not essential. By carrying the reactions only partly to completion, the rate at which ammonia can be vaporized for a given piece of equipment may be substantially increased. As ammonia is liberated from ammonium sulphate, the residual salt becomes more acidic. Hence, the last traces of ammonia are the most difficult to remove because they must be separated from a very acid salt. This also decreases the rate at which it is evolved. If the thermal decomposition reactions are carried only partly to completion, the operating costs will not be materially affected. The principal operating costs are the cost of absorbing the $SO_2$ from the flue gas; the cost of the evaporation step and the cost of the thermal decomposition step. The latter two are the principal costs. The cost of the evaporation step is dependent upon the concentration of ammonium acid sulphite solution removed from the scrubber. The more concentrated this solution, the smaller the evaporation load. The heat required to carry out the thermal decomposition is the sum of the heat of reaction which must be supplied plus the heat required to heat the products up to the reaction temperature which will be about 350° C. Obviously, if the thermal decomposition step is carried only partly to completion, e. g., 50%, more heat will be required to heat the residual salt up to reaction temperature per pound of ammonia vaporized. The next step in the process is the evolution of $SO_2$ and the evaporation of the resultant sulphate solution. The heat content of the acid salt plus unreacted salt is available to raise the temperature of the ammonium sulphite solution and also to evaporate some of the water. Therefore, the additional heat required in the thermal decomposition step due to partial reaction is recovered in the evaporation step and the total heat requirements per pound of sulphur dioxide recovered is not materially changed.

It is inevitable that some of the $SO_2$ be oxidized to $SO_3$ in the scrubber. This means the sulphate concentration will start to build up. Means must be available for desulphating the system. This can be readily accomplished by removing some of the acid sulphate; dissolving it in water and treating the solution with finely ground limestone. The reaction may be represented as:

(6) 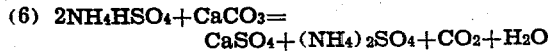
$$2NH_4HSO_4 + CaCO_3 = CaSO_4 + (NH_4)_2SO_4 + CO_2 + H_2O$$

The $CaSO_4$ is insoluble in the ammonium sulphate solution. It is filtered off and the ammonium sulphate returned to the evaporation step.

In many circumstances it is desirable to prevent the oxidation. The present process, when slightly modified, insures a substantial reduction in the oxidation of sulphur dioxide. In the usual operation the sulphur dioxide-containing gas passes through an absorber counter-current to a solution which has a diminishing capacity for sulphur dioxide as it flows from the top of the absorber to the bottom. Under these conditions where ammonium sulphite or sodium sulphite is the absorbent the solution entering the top of the tower changes in composition from $(NH_4)_2SO_3$ or $Na_2SO_3$ to $2NH_4HSO_3$ or $2NaHSO_3$ as the sulphur dioxide is absorbed. As is known, solutions composed of bisulphites such as sodium or ammonium bisulphites are less readily oxidized than solutions composed of normal or monosulphites. Moreover solutions which contain both mono and bisulphites are oxidized more readily than monosulphite solutions. This is the condition which obtains in the usual absorber.

The present process may be operated to minimize such oxidation. In this operation a solution of ammonium acid sulphite is circulated through the tower. Ammonia is introduced at the proper rate into the gas stream prior to the gas stream reaching the absorber. This insures intimate dispersion of the ammonia through the gas stream and insures intimate contact with the sulphur dioxide in such stream. The ammonia is fed in so as to provide a mol of ammonia for each mol of sulphur dioxide in the stream. As the stream is contacted with water ammonium acid sulphite is formed and is dissolved. By this method of operation not only is the oxidation of the sulphur dioxide held to a minimum but also the equipment requirements for the absorption step is greatly simplified. This is apparent when it is realized that as soon as the temperature of the gas stream is lowered sufficiently solid ammonium acid sulphite will form due to the reaction between sulphur dioxide, ammonia and water vapor. Thus, the function of the absorber is essentially the removal and dissolution of this compound from the gas stream.

It will now be seen that the described process invokes a novel concept in the removal and recovery of acidic gases the utilization of which insures new results. As will have been seen, the described cyclic volatile base method, disregarding mechanical losses, presents a truly complete regenerative system since only sulphur dioxide is introduced and withdrawn. The method permits the effective treatment of gases which contain only a small percentage of sulphur dioxide and insures high recoveries because of the minimization of oxidation of the sulphur dioxide.

While preferred embodiments of the invention have been described it is to be understood that these are given didactically to illustrate and explain the underlying principles involved and not as limiting the scope of the invention to these particular illustrative embodiments.

We claim:

1. A method of recovering sulphur dioxide from flue gases which comprises, contacting the gas with ammonia in the presence of water to form ammonium bisulphite; reacting the solution of ammonium bisulphite with ammonium acid sulphate under conditions regulated to evolve sulphur dioxide and form ammonium sulphate; recovering the evolved sulphur dioxide; thermally decomposing the ammonium sulphate solution to separately recover ammonia and ammonium acid sulphate therefrom; utilizing the separated ammonia to react with incoming gas and utilizing the recovered ammonium acid sulphate to treat an additional quantity of ammonium bisulphite.

2. A method of recovering sulphur dioxide from sulphur dioxide-containing gases which comprises, contacting the gas with ammonia and water to thereby form ammonium bisulphite; reacting the ammonium bisulphite with ammonium acid sulphate under conditions regulated to evolve sulphur dioxide and form a solution of ammonium sulphate; recovering the evolved sulphur dioxide; thermally decomposing the ammonium sulphate solution to separately recover ammonia and ammonium acid sulphate therefrom and recycling such recovered ammonia and ammonium acid sulphate to preceding steps in the process.

3. A method of recovering sulphur dioxide from sulphur dioxide-containing gases which comprises, contacting the gas with ammonia and water under conditions regulated to form a solution of ammonium bisulphite; reacting such bisulphite solution with sodium acid sulphate under conditions regulated to evolve sulphur dioxide and form a solution containing ammonium sulphate and sodium sulphate, recovering the evolved sulphur dioxide; thermally decomposing such solution to separately recover ammonia and sodium acid sulphate and recycling such recovered ammonia and sodium acid sulphate to preceding steps of the process.

4. A method of recovering sulphur dioxide from sulphur dioxide-containing gases which comprises, contacting the gas with ammonia and water under conditions which are controlled to form a solution of ammonium bisulphite; reacting the bisulphite solution with potassium acid sulphate under conditions regulated to evolve sulphur dioxide and form a solution containing ammonium sulphate and potassium sulphate; recovering the evolved sulphur dioxide; thermally decomposing the sulphate solution to separately recover ammonia and potassium acid sulphate and recycling the recovered ammonia and potassium acid sulphate to preceding steps of the process.

5. A method of recovering sulphur dioxide from sulphur dioxide-containing gases which comprises, contacting the gas with ammonia and water under conditions regulated to form a solution of ammonium bisulphite; reacting the bisulphite solution with an alkali metal acid sulphate under conditions regulated to evolve sulphur dioxide and form a solution containing ammonium sulphate and an alkali metal sulphate; recovering the evolved sulphur dioxide; thermally decomposing the said sulphate solution to recover ammonia and an alkali metal acid sulphate therefrom and recycling the recovered ammonia and alkali metal acid sulphate to preceding steps in the process.

6. A method of recovering sulphur dioxide from sulphur dioxide-containing gases which comprises, contacting the gas in an absorption stage with ammonia and water to thereby form a solution of ammonium bisulphite; reacting such solution in a reaction stage with an alkali metal acid sulphate under temperature conditions regulated to evolve sulphur dioxide and form a solution containing ammonium sulphate and the corresponding alkali metal sulphate; recovering the evolved sulphur dioxide; thermally decomposing the said sulphate solution under conditions regulated to evolve ammonia and regenerate the said alkali metal acid sulphate; recycling the evolved ammonia to the said absorption stage and recycling the alkali metal acid sulphate to the said reaction stage.

7. A method of recovering sulphur dioxide from sulphur dioxide-containing gases which comprises, contacting the gas in an absorption stage with ammonia and water to thereby form a solution of ammonium bisulphite; treating such solution in a reaction stage with an alkali metal acid sulphate under temperature conditions regulated to evolve sulphur dioxide and form a solution containing ammonium sulphate and the corresponding alkali metal sulphate; recovering the evolved sulphur dioxide; evaporating the said solution; thermally decomposing the evaporated residue under temperature conditions controlled to evolve ammonia and regenerate the said alkali metal acid sulphate; recycling the evolved ammonia to the absorption stage and the alkali metal acid sulphate to the reaction stage.

8. A method of recovering acidic gases from acidic gas-containing mixtures which comprises, contacting the gas stream with ammonia and water under conditions regulated to form an acid salt of ammonia and such acidic gas; reacting such acid salt with ammonium acid sulphate under conditions regulated to evolve the said acidic gas and form ammonium sulphate; treating the ammonium sulphate to separately recover ammonia and ammonium acid sulphate therefrom and recycling the recovered ammonia and ammonium acid sulphate to preceding steps in the process.

9. A method of recovering sulphur dioxide from sulphur dioxide-containing gases which comprises, contacting the gases with ammonia and water to thereby form a solution of ammonium bisulphite; reacting the ammonium bisulphite with ammonium acid sulphate under temperature conditions controlled to evolve sulphur dioxide and form a solution of ammonium sulphate; recovering the evolved sulphur dioxide; evaporating the ammonium sulphate solution; thermally decomposing the residue to recover ammonia and ammonium acid sulphate therefrom, recycling such ammonia in the process for contact with incoming gases and recycling the recovered ammonium acid sulphate to treat additional quantities of ammonium bisulphite.

ARTHUR W. HIXSON.
RALPH MILLER.